US007865089B2

(12) United States Patent
Andreoli et al.

(10) Patent No.: US 7,865,089 B2
(45) Date of Patent: Jan. 4, 2011

(54) SOFT FAILURE DETECTION IN A NETWORK OF DEVICES

(75) Inventors: Jean-Marc Andreoli, Meylan (FR); Guillaume Bouchard, Bernin (FR); Victor Ciriza, La Tour du Pin (FR)

(73) Assignee: Xerox Corporation, Norwalk, CT (US)

( * ) Notice: Subject to any disclaimer, the term of this patent is extended or adjusted under 35 U.S.C. 154(b) by 1266 days.

(21) Appl. No.: 11/436,819

(22) Filed: May 18, 2006

(65) Prior Publication Data
US 2007/0268509 A1 Nov. 22, 2007

(51) Int. Cl.
*G03G 15/00* (2006.01)
*G11B 7/00* (2006.01)
(52) U.S. Cl. ............... 399/8; 399/9; 399/10; 399/11; 399/16; 399/18; 399/42; 399/75; 399/82; 399/85; 399/87; 369/125
(58) Field of Classification Search ............... 399/8–11, 399/16, 18, 42, 75, 82, 85, 87; 369/125
See application file for complete search history.

(56) References Cited

U.S. PATENT DOCUMENTS

| 2004/0117186 | A1 | 6/2004 | Ramakrishnan et al. |
| 2004/0181712 | A1 | 9/2004 | Taniguchi et al. |
| 2005/0193284 | A1 | 9/2005 | Yasuo |
| 2006/0132826 | A1* | 6/2006 | Ciriza et al. ............... 358/1.15 |
| 2006/0206445 | A1 | 9/2006 | Andreoli et al. |

OTHER PUBLICATIONS

Andrieu et al., "An Introduction to MCMC for Machine Learning," Kluwer Academic Publishers, Machine Learning, 50, pp. 5-43 (2003).
Ghahramani et al., "Factorial Hidden Markov Models," Massachusetts Institute of Technology, pp. 8 (1994).
Lane et al., "Sequence Matching and Learning in Anomaly Detection for Computer Security," In Proc. of AAAi-97 Workshop on AI Approaches to Fraud Detection and Risk Management, Providence, RI (1997).
Lee et al., "Algorithms for Non-negative Matrix Factorization," In *NIPS*, pp. 556-562 (2000).
Andreoli et al, "Probabilistic Latent Clustering of Device Usage," IDA Conference, Sep. 10-12, 2005.

* cited by examiner

*Primary Examiner*—David P Porta
*Assistant Examiner*—Mindy Vu
(74) *Attorney, Agent, or Firm*—Fay Sharpe LLP (57) ABSTRACT

In a method for monitoring hardware devices of the hardware devices network to detect failures, past logged jobs are analyzed to determine a pattern of past usage of hardware devices by users of the hardware devices network. A failure of a hardware device is inferred based on a deviation in usage of the hardware devices from the pattern of past usage. In some embodiments, a state model is constructed that assigns one of two or more available operational states to each hardware device of the hardware devices network based on a recent load of jobs logged to the hardware device and a stored history of logged jobs indicative of typical loading of the hardware devices. One or more failing hardware devices are identified based on the assigned operational states.

21 Claims, 4 Drawing Sheets

SOFT FAILURE DETECTION IN A NETWORK OF DEVICES

BACKGROUND

The following relates to the hardware monitoring and management arts. It is described with example reference to monitoring and management of printing devices of a printing devices networks. However, the following is amenable to monitoring and managing other hardware device networks, such as networks of facsimile machines, networks of optical scanners, networks of copiers, networks of multifunctional hardware devices that may include for example printing, copying, facsimile, scanning, and optionally other capabilities, networks of various combinations of printing devices, scanners, copiers, multifunctional hardware devices, or so forth.

In modern business, office, educational, and other settings, it is common to provide a digital network that interconnects hardware devices with users located at personal computers, workstations, or so forth. The hardware devices network advantageously enables users to send a job to a selected hardware device of the hardware devices network. In a typical arrangement, a printing devices network for an office spanning several floors of an office building may include one or more printing devices on each floor. Usually, a person will choose to print on a primary printing device which is located close to the person, such as on the same floor or in the same wing of the same floor. In some cases, the print job may require special features available on only some of the printing devices of the printing devices network—accordingly, in such cases the user will choose to send the print job to a nearby printing device having the needed special features. If one of the printing devices becomes unavailable, then users will no longer get results by sending print jobs to the unavailable printing device. Accordingly, in a short period of time the number of print jobs sent to the unavailable printing device will decrease to substantially zero.

Administration of such a printing devices network can be complex. Typically, a printing devices usage log is maintained by the print server that spools print jobs to the selected printing devices. The printing devices usage log records information about each print job, such as a timestamp of when the print job was submitted, a timestamp of when the print job was executed, a user name identifying the user who submitted the print job, a device name identifying the device to which the print job was sent, and optionally other information such as whether the print job was a black-only print job or a color print job, the type of paper or other print medium used for executing the print job, or so forth. This information can be used by a system administrator to determine when a particular printing device should be serviced, to identify users who may be abusing the network by submitting excessive numbers of print jobs, to bill printing costs to the appropriate entity (typically the sending user or the sending user's organization), or so forth.

One task of the administrator of a printing devices network is ensuring that the printing devices are operational. If a printing device becomes unavailable, either due to scheduled maintenance or due to a malfunction that causes the printing device to fail completely, the administrator may be made aware of the unavailability of that printing device by complaints from persons who normally use that printing device and are inconvenienced by its unavailability. On the other hand, inconvenienced users may simply send the print job to another device, and let someone else warn the administrator, thus substantially delaying notification of the administrator.

Similarly, in the case of a so-called "soft" failure, the printing device does not become unavailable, but rather suffers a malfunction, degradation, improper configuration, or other non-fatal problem. The soft-failing printing device still works, just not as well or as efficiently as before. For example, the printing device may begin to produce dirty, ruffled, creased, or otherwise marred printed sheets, or the printing device configuration may have been changed to produce an unduly long sleep period, or the printing device may be misconfigured so as to be unable to correctly print in a certain font, or so forth. When a soft failure occurs, users may or may not abandon the printing device entirely—they may continue to use it for less critical print jobs, or in the case of an unduly long sleep period may use it except in the morning or late evening when the printing device has gone into sleep mode, or may use it except when printing in the font type that no longer prints correctly, or so forth.

Users are less likely to complain to the system administrator about a soft failure, because the level of inconvenience is typically less then with complete unavailability. Rather, they will tend to go to another printing device for those print jobs that are seriously affected by the soft failure, and continue to use the failing device for jobs in which the impact of the soft failure is tolerable. The system administrator only hears about the soft failure when it has a severe impact on productivity (for example, when the end-of-quarter reports are coming due and everyone is trying to simultaneously generate pristine, high quality reports for upper management), or when the soft failure progresses to complete unavailability (for example, a minor crease in the middle of printed sheets caused by some mechanical misalignment evolves into continual jamming of sheets at the misaligned paper-handling component).

Accordingly, it is advantageous to enable system administrators to identify soft failures at an early stage. The difficulty in identifying soft failures increases as the size of the printing device network increases. In large corporation settings or so forth, the printing devices network may include dozens, hundreds, or more printers. Existing techniques for identifying soft failures generally rely upon user feedback, which as discussed previously is unreliable and sometimes delayed in the case of soft failures.

The foregoing background respective to printing device networks has close analogy in other hardware device networks. For example, in a network of copiers a given copier may suffer a soft failure if it produces dirty, ruffled, creased, or otherwise marred copies. In a network of facsimile machines, a given facsimile machine may suffer a soft failure in that it is unable to send long-distance faxes, or is unable to send faxes of more than a certain number of pages, or so forth.

CROSS REFERENCE TO RELATED PATENTS AND APPLICATIONS

The following are commonly assigned U.S. patent applications, each of which is incorporated herein by reference.

Andreoli et al., "Probabilistic Modeling of Shared Device Usage," Ser. No. 11/137,565 filed May 26, 2005 is incorporated herein by reference in its entirety. This application has since published as U.S. Pub. No. 2006/0206445 A1 on Sep. 14, 2006, and relates at least to probabilistic latent clustering analyses of printing device usage.

Ciriza et al., "Automated Job Redirection and Organizational Management," Ser. No. 11/013,322 filed Dec. 15, 2004 is incorporated herein by reference in its entirety. This application has since published as U.S. Pub. No. 2006/0132826 A1 on Jun. 22, 2006, and relates at least to automated print job redirection away from a malfunctioning printing device.

BRIEF DESCRIPTION

According to certain aspects illustrated herein, an apparatus is disclosed for monitoring printing devices of a printing devices network. A family of usage models represent typical usage of the printing devices of the printing devices network. An adaptation procedure allows selection of one model within that family, based on a printing devices usage log maintained by the printing devices network. A printing usage monitor is configured to detect deviation of logged usage of a printing device from the usage model, typically indicating a soft failure on that device.

According to certain aspects illustrated herein, a method is disclosed for detecting soft failures of hardware devices of a hardware devices network. Past logged jobs are analyzed to determine a pattern of past usage of hardware devices by users of the hardware devices network. A soft failure of a hardware device is inferred based on a deviation in usage of the hardware devices from the pattern of past usage.

According to certain aspects illustrated herein, a storage medium is disclosed encoding instructions which when executed by a processor communicating with a hardware devices network performs a method for monitoring hardware devices of the hardware devices network. The method includes: (i) constructing a state model that assigns one of two or more available operational states to each hardware device of the hardware devices network based on a recent load of jobs logged to the hardware device and a stored history of logged jobs indicative of typical loading of the hardware devices; and (ii) identifying one or more failing hardware devices based on the assigned operational states.

DETAILED DESCRIPTION

Figure 1:
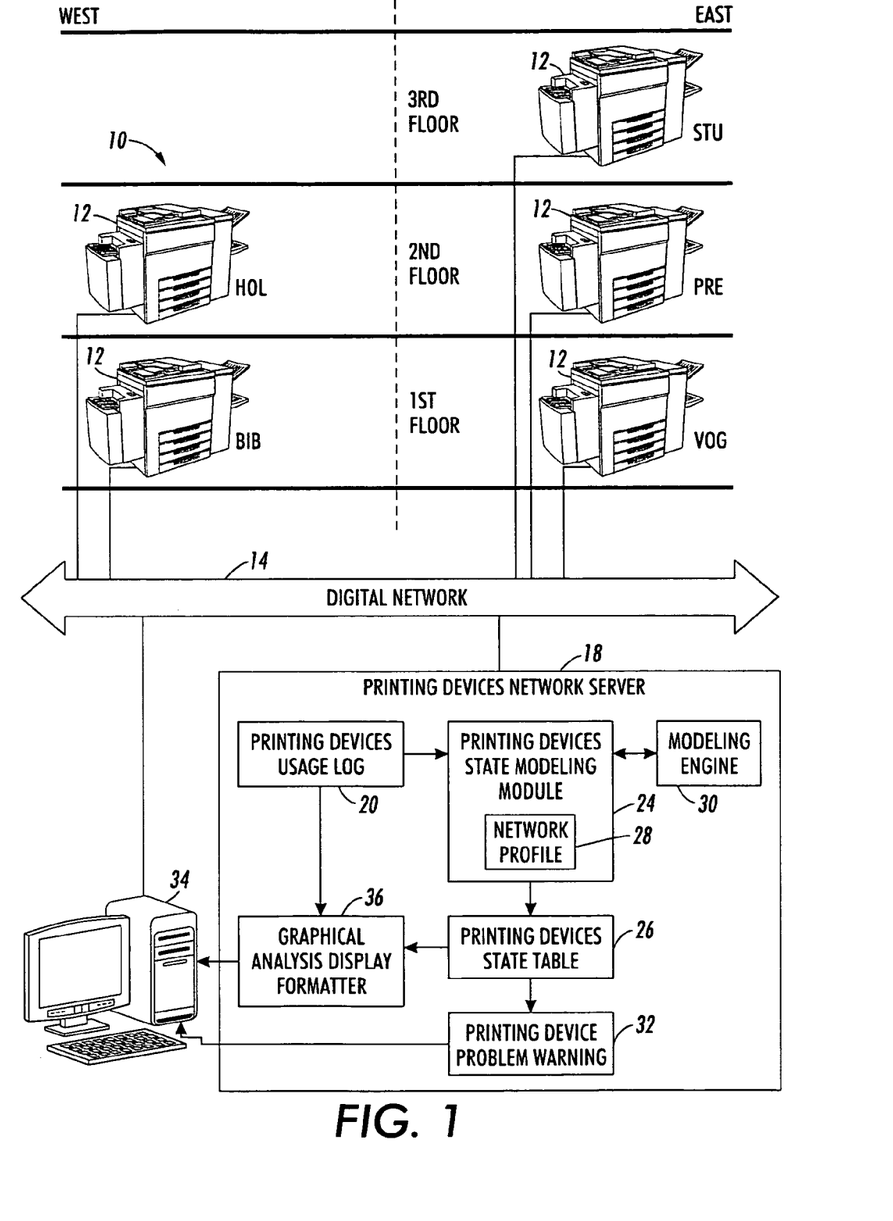
FIG. 1 diagrammatically shows a printing devices network including a printing devices network server that spools print jobs to destination printing devices and monitors the network for failing printing devices.

With reference to FIG. 1, an example printing devices network 10 includes five example printing devices 12 identified as "Stu", "Hol", "Pre", "Bib", and "Vog". The printing devices 12 are laid out in the east and west wings of a three-floor office space. In the illustrated embodiment, "Bib" and "Vog" are disposed in the west and east wings, respectively, of the first floor of the office space. "Hol" and "Pre" are disposed in the west and east wings, respectively, of the second floor of the office space. "Stu" is disposed in the east wing of the third floor of the office space. While five example printing devices 12 are shown in the example printing devices network 10, it is to be appreciated that the number of printing devices in the printing devices network may be substantially any number, such as four, six, seven, eight, ten, twenty, fifty, ninety, one-hundred, five-hundred, or more. Moreover, while three-letter names are used as device identifiers for the example five printing devices 12, device identifiers of substantially any type can be used, such as longer names, numeric identifications, hexadecimal identification numbers, alphanumeric serial numbers, or so forth.

The example printing devices 12 of the printing devices network 10 are connected as a network by a digital network 14, which may be for example a local area network (LAN), a wireless local area network (WLAN), or so forth. A printing devices network server 18 manages spooling or other conveyance of print jobs to selected destination printing devices of the printing devices network 10. Selection of print job destinations is usually made by the initiating users (not shown in FIG. 1, but users are typically distributed in the office space, for example in offices, cubicles, or other workspaces on the first, second, and/or third floors, and access the digital network 14 and thus the printing devices network 10 using personal computers, laptop computers, workstations, or other networked computers or other networked hardware devices). The selection of printing device to which a given print job is sent is typically made based on location proximity, with secondary considerations such as the capabilities of the printing device. Thus, for example, users located in the east wing of the second floor are likely to send print jobs to the "Pre" printing device which is located in the east wing of the second floor, since it is close to where they work, while users located on the west wing of the first floor are likely to send print jobs to the proximate "Bib" printing device.

However, it will be appreciated that if one of the printing devices is failing, then some print jobs may be redirected away from that failing printing device. Moreover, the fraction of jobs that are redirected may depend upon the extent of the failure. Almost all print jobs will be redirected away from a wholly non-functional printing device, whereas only certain print jobs may be redirected away from a soft failing printing device based on how the soft failure (e.g., partial malfunction, misconfiguration, or so forth) will impact the print job.

Each print job is logged in a printing devices usage log 20 maintained by the printing devices network server 18. The logged information typically includes at least a timestamp indicating when the print job was submitted, a device name indicating the destination printing device (e.g., "Stu", "Hol", "Pre", "Bib", or "Vog", or alternatively suitable one-to-one equivalent index numbers, corresponding network addresses, or so forth), and a user name identifying the initiating user (or, alternatively, a user account identification or other information about the sender). Additional information is optionally also logged, such as whether the print job was a black-only print job or a color print job, the type of paper or other print medium used for executing the print job, the number of printed sheets, or so forth.

A printing devices state modeling module 24 processes the printing devices usage log 20 to determine and maintain a state table 26 indicating an operational state of each printing device 12 of the printing devices network 10. The operational state assigned to each printing device 12 is selected from the group consisting at least of an unavailable state in which the printing device is not available, and a normal state in which the printing device is working normally. In some embodiments, one or more discrete or continuous intermediate states are also in the group of selectable states. The intermediate state or states are intermediate between the unavailable and normal states, and suitably indicate that the printing device is experiencing a soft failure intermediate between being unavailable and working normally. The optional intermediate states allow the operational state to indicate a soft failure of a printing device, in which the device remains operational but at a reduced capacity due to some malfunction, miscalibration, or so forth.

In addition to making use of the printing devices usage log 20, the printing devices state modeling module 24 may also incorporate or access a printing devices network profile 28 that indicates which devices are available on the network, and optionally includes other information such as features or capabilities of each printing device. The printing devices state modeling module 24 may also incorporate or access a modeling engine 30 that employs probabilistic modeling, such as factorial hidden Markov-based modeling, to determine the operational states of the printing devices 12. If the operational state of one of the printing devices indicates a possible soft failure or non-operational status, then a printing device problem warning 32 is optionally sent to a system administrator 34. Additionally or alternatively, a graphical analysis display formatter 36 formats a graphical plot or other display that shows the logged usage of printing devices, optionally along with operational state information, in an intuitive manner enabling the system administrator 34 to identify possible soft failures or non-operational status of one or more of the printing devices 12.

Having set forth an illustrative example printing devices network 10 including the printing devices 12 and the printing devices network server 18, some suitable soft failure detection approaches comporting with this illustrative example printing devices network 10 are set forth.

The printing devices network is assumed to include $N_d$ devices, where $N_d$ is greater than one, and may be for example four, six, seven, eight, ten, twenty, fifty, ninety, one-hundred, five-hundred, or more. A number $N_u$ users send print jobs to the various printing devices. $N_u$ is greater than one, and is typically five, ten, twenty, fifty, one-hundred, five-hundred or more users. User device interactions are observed via the printing devices usage log 20 at time instants $t_1, t_2, \ldots t_n$. At each time instant, any given printing device 12 is in a state $s_{di}$ $\in [0, 1]$, where the index d denotes the printing device, and the index i denotes the time instant. The operational state $s_{di}=0$ indicates that the device is likely not to be used (that is, in the load is substantially zero and hence the printing device is likely to be non-operational). The operational state $s_{di}=1$ means that the users perceive the device as properly working (that is, the printing device is carrying its normal load of print jobs). Intermediate operational states $0<s_{di}<1$ are suitably interpreted as the proportion of normal users of that printing device who are satisfied with its performance. If the operational state $s_{di}$ decreases from normal operation ($s_{di}=1$), this indicates that the performance of the printing device is becoming less than satisfactory, possibly indicating an incipient soft failure. If the operational state decreases to close to zero, this indicates a more serious soft failure that is causing many users to redirect print jobs away from the failing printing device. If the operational state reaches zero, this implies that the printing device is likely to be non-operational since most or all print jobs are being redirected away from the printing device.

In some embodiments, the modeling engine 30 employs a parameterized probabilistic model. In a parameter learning phase, the printing devices usage log 20 is considered over a period of a day, several days, a week, several weeks, or longer, and model parameters are learned on this initial dataset. The trained model thus embodies the past pattern of usage of the printing devices 12 of the printing devices network 10. During an exploitation phase, the trained probabilistic model is used to detect soft failures or non-operability based on deviation in usage of the hardware devices from the pattern of past usage. Every print job sent to a printing device corresponds to an $(N+1)^{th}$ observation at time $t_{N+1}$. Based on the information available at time $t_{N+1}$, the probabilistic model is used to estimate the device state $S_{d(N+1)}$ for each printing device 12. The printing device problem warning 32 is issued if the estimated state $s_{di}$ of a printing device is classified as critical (because the operational state is at or close to zero, or is below a warning threshold, or has decreased at a substantial rate, or so forth). Additionally or alternatively, the printing device problem warning 32 can be issued to users who commonly send print jobs to the failing printing device, that is, to users for whom the failing printing device is their primary printing device. To take into account time evolution in the pattern of usage of the printing devices network 10, the learning can be repeated with the additional or more recent data. Since this operation can be slow, update learning is optionally not performed after every observation (that is, not performed after every time stamped print job). In some embodiments, an online learning algorithm is used.

Some suitable probabilistic modeling is set forth herein using a statistical viewpoint. The printing devices usage log 20 is considered to include N time-sorted print jobs with timestamps $t=(t_1, \ldots, t_N)$ initiated by users $u=(u_1, \ldots, u_N)$ where each element $u_i \in \{1, \ldots, N_u\}$ is the index of the user that initiates the print job at time stamp $t_i$. A time series model is defined by a distribution over the destination printing devices $d=(d_1, \ldots, d_N)$ corresponding to the N time stamped print jobs, where the elements $d_i$ are printing device indexes in the set $\{1, \ldots, N_d\}$ and $s=\{s_{di}\}$ is the device state matrix or table 26, where $1 \leq d \leq N_d$ and $1 \leq i \leq N$. A probability density function $p_\theta(d, s|t, u)$ of this distribution is assumed to be parameterized by $\theta$ and is conditioned over the time instants t. The initial or training dataset is $(t^{(0)}, u^{(0)}, d^{(0)})$, where $t^{(0)}$, $u^{(0)}$ and $d^{(0)}$ are vectors containing time stamps, user indexes, and device indexes, respectively, used for the model training. During the training phase, an estimator $\hat{\theta}$ of $\theta$ is determined from the initial dataset $(t^{(0)}, u^{(0)}, d^{(0)})$. During the inference phase, at time $t_i$ and for each printing device d, the state distributions $P(s_{di}|t_{1:i}, u_{1:i}, d_{1:i})$ are estimated, where $x_{a:b}$ denotes the set of variables $(x_a, x_{a+1}, \ldots, x_b)$. The administrator warning 32 is based on the values $\hat{s}_{di}$ where $\hat{s}_{di}$ suitably represents the mode of the distribution $\text{argmax}_{s_{di}} p(s_{di}|t_{1:i}, u_{1:i}, d_{1:i})$ or the expectation $E(s_{di}|t_{1:i}, u_{1:i}, d_{1:i})$. The updating of the training is based on augmented data constructed by augmenting the initial dataset $(t^{(0)}, u^{(0)}, d^{(0)})$ with more recent data $(t_{1:i}, u_{1:i}, d_{1:i})$, that is, the updating training set is $(t^{(0)}, u^{(0)}, d^{(0)})+(t_{1:i}, u_{1:i}, d_{1:i})$. In some embodiments, the updating training set may drop off some of the oldest data in the initial dataset $(t^{(0)}, u^{(0)}, d^{(0)})$ to better reflect the evolving pattern of usage of the printing devices network 10.

In some embodiments, the probabilistic model employs a factorial hidden Markov-based model. For simplicity, in the following examples the dependency on variables ti is not explicitly shown. The following assumptions are made: the device dynamic is Markovian, that is, $p(s_{i+1}|s_{1:i})=p(s_{i+1}|s_i)$; and the device dynamics are independent at each instant, that is, $$p(s_i) = \prod_{d=1}^{N_d} p(s_{di}). \quad (1)$$

The choice of destination printing device is made by the user who initiates the print job, and the current state of the devices is $s_i$. The condition $p(d_i|s_{1:i}, u_{1:i}, d_{1:i-1}) = p(d_i|s_i, u_i)$ holds for any instant $t_i$. It is further assumed that this distribution does not depend on the time t.

Figure 2:
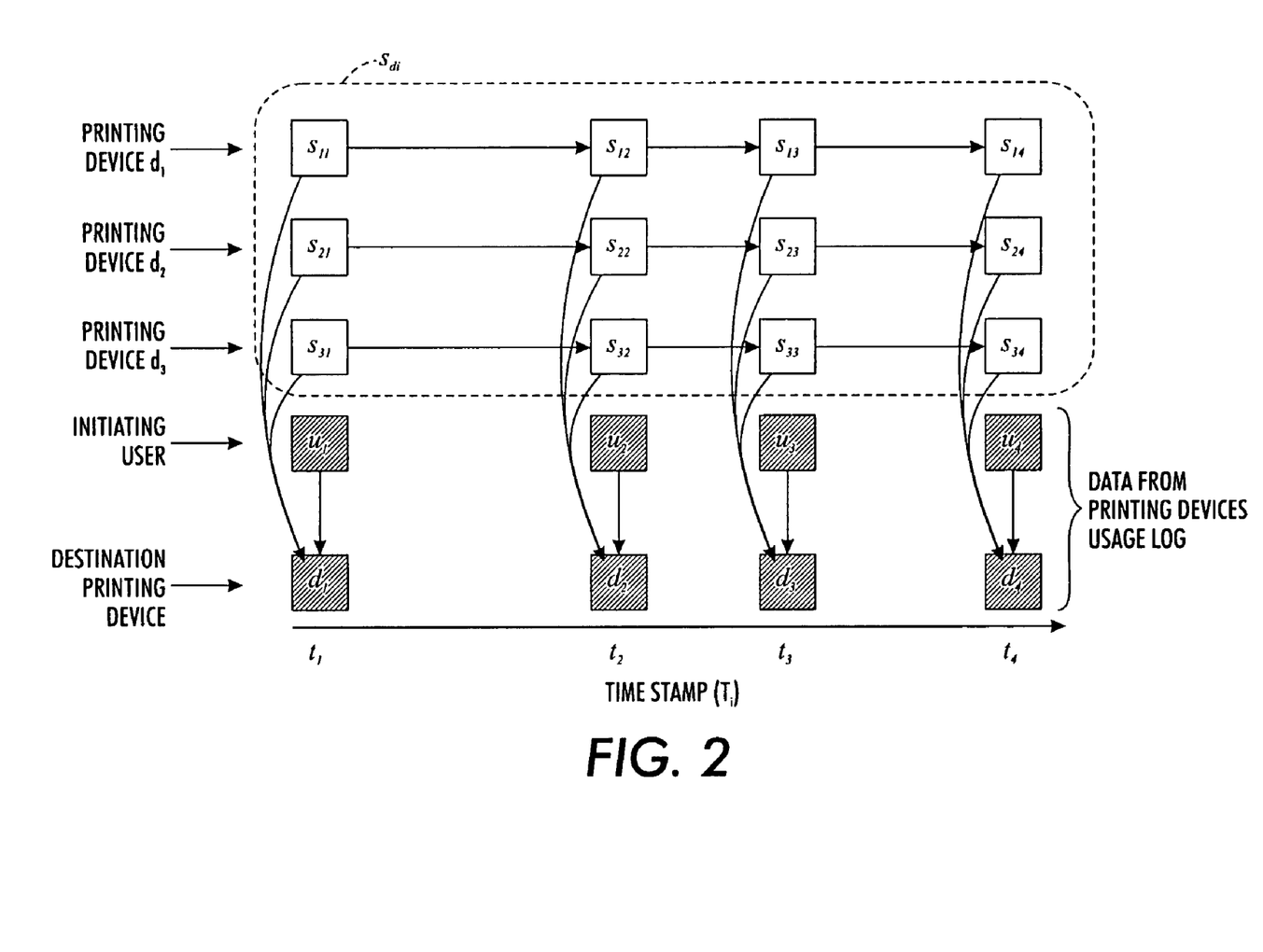
FIG. 2 diagrammatically shows graphical model diagrammatically representing states and observables of a Factorial Hidden Markov Model (FHMM).

With reference to FIG. 2, the foregoing assumptions are readily represented through the graphical model diagrammatically shown in FIG. 2, which comports with a Factorial Hidden Markov Model (FHMM), described for example in Ghahramani and Jordan, "Factorial Hidden Markov Models", in Advances in Neural Information Processing Systems, Touretzky, Mozer, and Hasselmo, editors, volume 8 pages 472-78, (MIT Press, 1996). In FIG. 2, a partial diagrammatic model for a simplified printing devices network is diagrammatically shown, including three example printing devices ($d_1$, $d_2$, $d_3$), and example data from a portion of the printing devices usage log 20 including four time stamps ($t_1$, $t_2$, $t_3$, $t_4$). It will be appreciated that training is typically performed on a larger initial dataset ($t^{(O)}$, $u^{(O)}$, $d^{(O)}$) where the number of users may be in the tens, hundreds, or more, the number of devices is a half-dozen, dozen, tens, hundreds, or more printing devices, and the number of logged time stamped print jobs used for training is in the tens, hundreds, thousands, or more. The example FHMM method is suitably defined using the time series $p_\Theta(s_{d(i+1)}|s_{di})$ and the observation distributions $p_\Theta(d_i|s_i, u_i)$. A number of distributions can be used. In the following, a distribution is set forth that has been found to work well for modeling of printing device networks.

In some embodiments, the allowable operational states (that is, the allowable values of operational states) is discretized to a set of allowable values between zero and unity, inclusive. Optionally, at least one intermediate third value (e.g., 0.5, or 0.25, 0.5, 0.75, or so forth) is included to enable the operational state to reflect a soft failure that is intermediate between complete non-operability and completely normal operation. For example, the allowable states in some embodiments take on the values:

$$\left\{0, \frac{1}{L}, \frac{2}{L}, \ldots, \frac{L-1}{L}, 1\right\}, \quad (2)$$

where L denotes the number of levels. For example, if L=1 then the allowable states are $\{0, 1\}$, and soft failures are coarsely discretized. If L=2 then the allowable states are $\{0, \frac{1}{2}, 1\}$, allowing finer discretization of soft failures. If L=3 then the allowable states are $\{0, \frac{1}{3}, \frac{2}{3}, 1\}$, and so forth. It is also contemplated to use a continuous space in which the intermediate states define a continuum between zero and unity. The transition matrix of the Markov chain between any two time instants $t_a$ and $t_b$ is suitably given by:

$$T_{t_b-t_a} = \exp(-Q \cdot (t_b - t_a)) \quad (3),$$

where Q is a parameter matrix whose rows sum to zero, so that by construction, the rows of the transition matrix sum to unity. In Equation (3), an exponential matrix operator exp( ) is used, and is suitably defined using a Taylor series or the like. The approach of Equation (3) is based on the continuous time Markov process theory. In this framework, the matrix Q is called the infinitesimal generator, and is a matrix for a discrete operational state space. The conditional probability of a state $s_{d(i+1)}$ given $s_{di}$ is selected in the matrix $T_{t(i+1)-ti}$ where the row index is $(1+s_{di}L)$ and the column index is $(1+s_{d(i+1)}L)$. For the specific case L=1 (no intermediate states, allowable states are zero and unity), the state dynamic has a clear interpretation in terms of breakdown/repair operations. The infinitesimal generator is 2×2 matrix with two parameters is as follows:

$$Q = \begin{bmatrix} -\rho & \rho \\ \tau & -\tau \end{bmatrix}, \quad (4)$$

where $\tau$ represents a printing device failure rate and $\rho$ represents a printing device repair rate. The transition matrix has the following form:

$$T_{\Delta_t} = \frac{1}{\rho + t} \cdot \begin{bmatrix} \tau + \rho \cdot \exp(-(\rho + \tau)\Delta_t) & \rho - \rho \cdot \exp(-(\rho + \tau)\Delta_t) \\ \tau - \tau \cdot \exp(-(\rho + \tau)\Delta_t) & \rho + \tau \cdot \exp(-(\rho + \tau)\Delta_t) \end{bmatrix}. \quad (5)$$

The stationary state of the Markov chain is $$\left(\frac{\tau}{\rho + \tau}, \frac{\rho}{\rho + \tau}\right).$$

Under the stationary distribution, the proportion of working devices is $$\frac{\rho}{\rho + \tau}.$$

For L>1, there are one or more discrete intermediate states enabling modeling of soft printing device failures. In these cases, the physical interpretation of terms of the infinitesimal generator matrix Q is less apparent. However, since the number of terms in the infinitesimal generator matrix Q is small (the Q matrix has (L+1)×(L+1) elements for L levels, e.g., for L=3 the Q matrix is a 4×4 matrix) and is expected to exhibit substantial symmetry, the terms of the Q matrix are readily evaluated by fitting these parameters to the initial dataset ($t^{(O)}$, $u^{(O)}$, $d^{(O)}$).

User device choices are suitably modeled by assuming that a given user chooses a device randomly according to a user-specific distribution. Typically, each user will have a corresponding primary printing device, denoted d, on which the user typically prints. Users can be grouped into user communities each corresponding to a primary printing device. Each user community primarily prints on its corresponding primary printing device. The probability of choosing the primary printing device d depends on the state of the printing devices: if the user's primary printing device d is unavailable or is undergoing a soft failure, then another device d' will be chosen with a higher probability—that is, the user will tend to redirect the print job from primary printing device d to an alternative printing device d'. In the case of a printing device that is unavailable ($s_{di}$=0), the probability of selection should still not be zero—for example, the user may not know that the primary printing device d is out of order. The following conditional probability has been found to be useful:

$$p(d \mid u, s) = \frac{\pi_{ud} \cdot \varepsilon^{(1-s_d)}}{\sum_{d'=1}^{N_d} \pi_{ud'} \cdot \varepsilon^{(1-s_{d'})}}. \quad (6)$$

Where the proportions $\pi_{ud}$ represent the users' preferences in the absence of any soft failure or unavailability of any printing device. In other words, $\pi_{ud}$ represents the grouping of users into communities corresponding to primary printing device. Equation (6) can be interpreted as follows: when all the printing devices are working normally ($s_d=1$ for all devices d), then the profile of user u is given by the proportions $\pi_{ud}$, which sets forth a high probability that the user will choose to send a print job to the user's primary printing device. On the other hand, if the primary printing device d is experiencing a soft failure or is unavailable, then the proportion $\pi_{ud}$ is multiplied by $\varepsilon<1$, reflecting the fact that the user is less likely to print on the primary printing device if it is malfunctioning, miscalibrated, or so forth. In equation (6), the modified proportions $\pi_{ud} \varepsilon^{(1-s_d)}$ are normalized so as to obtain probabilities, which sum to unity.

Once the model is trained, it is suitably applied in the inference phase to determine whether a printing device is undergoing a soft failure or is unavailable. The inference task corresponds to evaluating $p(s_{d_i t}|t_{1:t}, u_{1:t}, d_{1:t})$. A suitable algorithm to find the exact solution is the Forward-Backward algorithm for hidden Markov modeling, but this exact solution is intractable for high dimensional hidden spaces, such as for factorial hidden Markov modeling in which the hidden space dimension is $(L+1)^{N_d}$. Accordingly, a suitable approximate solution is employed. In some embodiments, a modified Expectation-Maximization (EM) algorithm is used, in which expectation employs a Markov chain Monte Carlo estimation. In some embodiments, a particle filtering algorithm is used for the expectation component of the EM algorithm. In the particle filtering algorithm, the computational cost is linear in the number of devices. Other approximate approaches can be used, such as a variational approximation.

In some embodiments, the learning of the model parameters is done by the EM algorithm, which includes inference as a sub-task. Due to the advantageous physical interpretations suitable for the parameters τ (printing device failure rate), ρ (printing device repair rate), π (groupings of users into user communities by primary printing device), and ε (biasing toward user redirection of print jobs responsive to a soft failure), a simple heuristic has been found to give good results. First, the values for the failure and repair rate parameters τ and ρ can be observed over an extended time. Thus, these values may be set to reasonable values, based on the previous rates of printing device failure and repair. In the example of printing devices, about 2 failures per year, and a repair delay of about five to eight days, is typical for some printing devices networks. Thus, normalizing to units of per-day, $\tau \approx 2/365=0.0055$ failures/day and $\rho \approx 1/8=0.125$ repairs/day are typical. For a higher discretization (e.g., L>1) such that the terms of the Q matrix are more complex, numerical fitting to the initial dataset $(t^{(0)}, u^{(0)}, d^{(0)})$ is suitable. The user profiles $\pi_{ud}$ are suitably evaluated on the initial training dataset $(t^{(0)}, u^{(0)}, d^{(0)})$. The empirical proportions are typically insufficient to directly represent the user profiles $\pi_{ud}$, especially due to zeros in the data matrix (for example, a user u had never used a particular printing device d, but the proportion $\pi_{ud}$ for that user and device should not be zero). Data smoothing can address such granularity problems. In some embodiments, Laplace smoothing is used. In some embodiments, a Non-Negative Matrix Factorization (NMF) algorithm is used, which provides a low-order approximation of the user-device contingency table. The coefficient ε can be set to 0.1 or to another value by trial-and-error. For $\varepsilon=0.1$, the probability to print on a malfunctioning device is approximately the original proportion divided by ten.

With returning reference to FIG. 1, the foregoing has assumed that the printing devices 12 are interchangeable. In some printing device networks, however, not all devices are the same. For example, some printing devices may be color printers (which may or may not also be suitable for printing in black-only), while other printing devices may have black-only marking engines that are not suitable for color printing. The model is readily extensible to different categories, such as black-only and color printing, by decomposing the device state into K different states where K is the number of categories. For black-only and color categories, the states are $s_{dik}$, and the user profiles are defined for each category (user profiles parameters become $\pi_{udk}$). A black-only printing device will have only a single associated state, whereas a color printing device could have a single state (if it is only used for color print jobs) or could have two states (one for the color category and a second for the black-only category if it is sometimes used for black-only print jobs). In other words, there is a black usage model representing typical usage of the printing devices of the printing devices network for print jobs involving black only marking, and a color usage model representing typical usage of the printing devices of the printing devices network for print jobs involving color marking. Further, note that multiple states in different categories for the same printing device need not be the same. For example, a color printer in which the black marking engine is operational but the color marking engine or engines have failed may have a state $s_{di(color)}=0$ for color print jobs indicative of non-operability for color print jobs, whereas the same printer may have a state $s_{di(black)}=1$ indicating normal operation for black-only print jobs. In a similar fashion, other distinctions besides color/black only are readily accommodated by including a separate usage model with corresponding states for each category. Such other distinction may include, for example, ability to print two-sided copies, provision of high-quality paper or letterhead paper, or so forth.

With continuing reference to FIG. 1, it is advantageous for the modeling to be able to account for changes in the user profile. For example, users may come and go due to new hiring, retirements, or so forth. Moreover, a given user may change his or her work habits, either due to personal preference, or due to relocation within the office, or so forth. For example, an employee who is moved from the first floor to the third floor is likely to adopt the printing device "Stu" as his or her primary printing device after the move to the third floor, simply due to the close proximity of "Stu" to the employee's new third floor location. Such changes are readily accommodated by making the user profiles $\pi_{ud}$ adjustable over time. The notation $\pi_{ud}^t$ is used to denote the user profile at time t. This parameter is suitably considered as random with an initial Dirichlet distribution and the following dynamic:

$$\pi_{ud}^{t+1} = \begin{cases} \pi_{ud}^{t+1}, & \text{with probab. } e^{-\eta t} \\ p_{ud}^{t+1}, & \text{with probab. } 1-e^{-\eta t} \end{cases}, \quad (7)$$

where:

$$p_{ud}^{t+1} \sim D(\alpha) \qquad (8),$$

and $D(\alpha)$ represents a Dirichlet distribution with parameter $\alpha$. Hence the user profile is constant until a change appears. The change dates can be viewed as Poisson processes. Parameter $\eta$ on the other hand captures the expected rate of changes in user profile.

The profile of printing devices can also be adjusted as new printing devices are added or removed, or as existing printing devices are upgraded or lose certain features or capabilities. In the latter case, the new or lost features or capabilities are suitably accounted for by removing the existing printing device from the network profile, and adding a new printing device corresponding to the old printing device modified by the new or lost features or capabilities.

The foregoing factorial hidden Markov-based modeling of printing device failures was tested using printing logs from an actual office. The "timestamp", "userid" and "printerid" fields of print jobs were logged from Jan. 2, 2004 to May 31, 2004. Users that printed less than five times during this period were omitted from the analyses. The total number of print jobs in the analysis period was 27,639, involving 126 users and 26 printing devices. The factorial hidden Markov-based modeling set forth herein was used, with the binary discretisation (L=1). The parameters where set using the heuristic set forth herein, using non-negative matrix factorization (NMF) with 13 latent dimensions set using Bayesian information criterion (BIC) based on the analogy between probabilistic latent semantic analysis (PLSA) and NMF. The exact estimation method based on the Forward-Backward algorithms for factorial hidden Markov models was used on a subset of the data (so that the exact method was tractable) involving five printing devices having device identifications denoted "Pre", "Vog", "Stu", "Bib" and "Hol" laid out in the a building substantially as shown diagrammatically in FIG. 1, so as to observe redirections between these printing devices.

Figure 3:
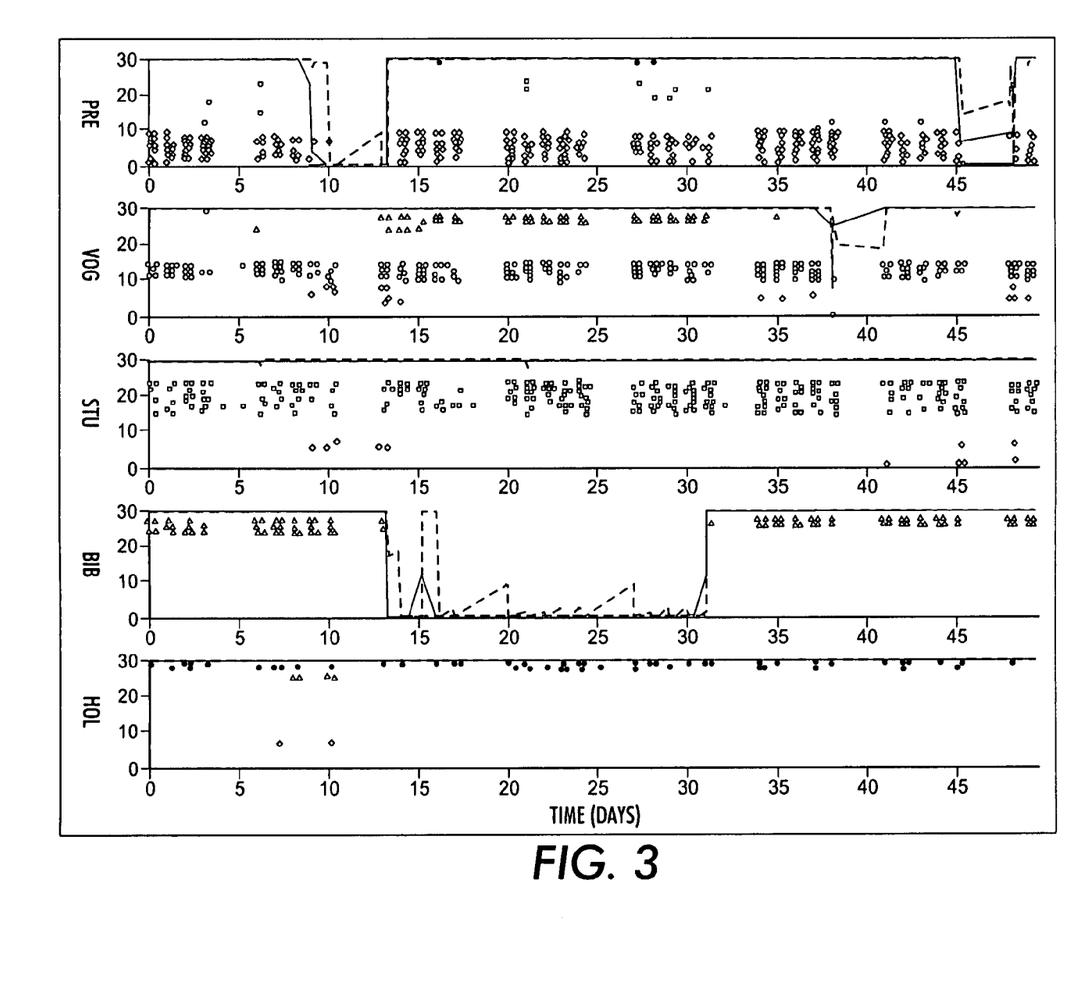
FIG. 3 diagrammatically plots the results of exact inference using the FHMM of print jobs sent to five printing devices over a period of about 50 days. Five parallel plots are shown corresponding to five printing devices "Pre", "Vog", "Stu", "Bib" and "Hol". Each print job is represented by a symbol, with the type of symbol used indicating which primary printing device the user typically employs. Users are also indexed by a user number that serves as the ordinate of the plot for each printing device. The inference modeling results are shown by a solid line. For comparison, a dashed line shows filtering of the raw data.

With reference to FIG. 3, the results of the exact inference are plotted. In FIG. 3, five parallel plots are shown corresponding to the five printing devices "Pre", "Vog", "Stu", "Bib" and "Hol". Each print job is represented by a symbol, with the type of symbol used indicating which primary printing device the user typically employs. Users are also indexed by a user number that serves as the ordinate of the plot for each printing device. Users numbered 1-10 used "Pre" as their primary printing device. Users numbered 10-14 used "Vog" as their primary printing device. Users numbered 15-23 used "Stu" as their primary printing device. Users numbered 24-27 used "Bib" as their primary printing device. Users numbered 28-30 used "Hol" as their primary printing device. The inference modeling results are shown by a solid line. For comparison, a dashed line shows filtering of the raw data.

The model has identified three soft failures. One failure spanning about days 13-31 was experienced by "Bib". By asking to the users of printer "Bib" if they had observe a failure during the period 13-31, they confirmed that a substantial breakdown occurred and that they had to wait two weeks for the "Bib" printing device to be repaired. The model correctly identified that a problem occurred because the users of "Bib" printed on "Vog" (both located on the same floor) during these two weeks. The printing device "Pre" experienced two failures: one at around days 10-13, and a second at around days 45-48. The first failure detected on printing device "Pre" starting at day 10 was a soft failure caused by a minor problem with "Pre" starting on Friday evening. Two users decided to print on "Vog" instead (located one floor down from "Pre") and three users printed on "Stu" (located one floor up). The printers "Stu" and "Pre" did not have specific features that are not available on "Pre", so this is likely to correspond to a real problem. A similar case occurred at about day 45, but in this case only three users switched to "Stu", so that the state estimation is not as clear as the previous one. The filtered operational state values indicate approximately 50% of chance that a soft failure occurred.

Looking at the difference between filtering and smoothing, it is also seen that there is a small delay between the first redirected print job and the detection of the failure by the algorithm. This is expected, since the operational state of a printing device will not begin to decrease away from the normal state ($s_{di}=1$) until a few print job redirections have occurred. The speed at which the algorithm detects a failure will in general depend upon the usual load (if the printing device is rarely used under normal conditions, it will generally take longer for the operational state to reflect the failure) and the extent of disablement of the printing device (a soft failure that causes few print job redirections will generally take longer to detect than a failure which results in immediate and complete non-operability of the printing device).

Figure 4:
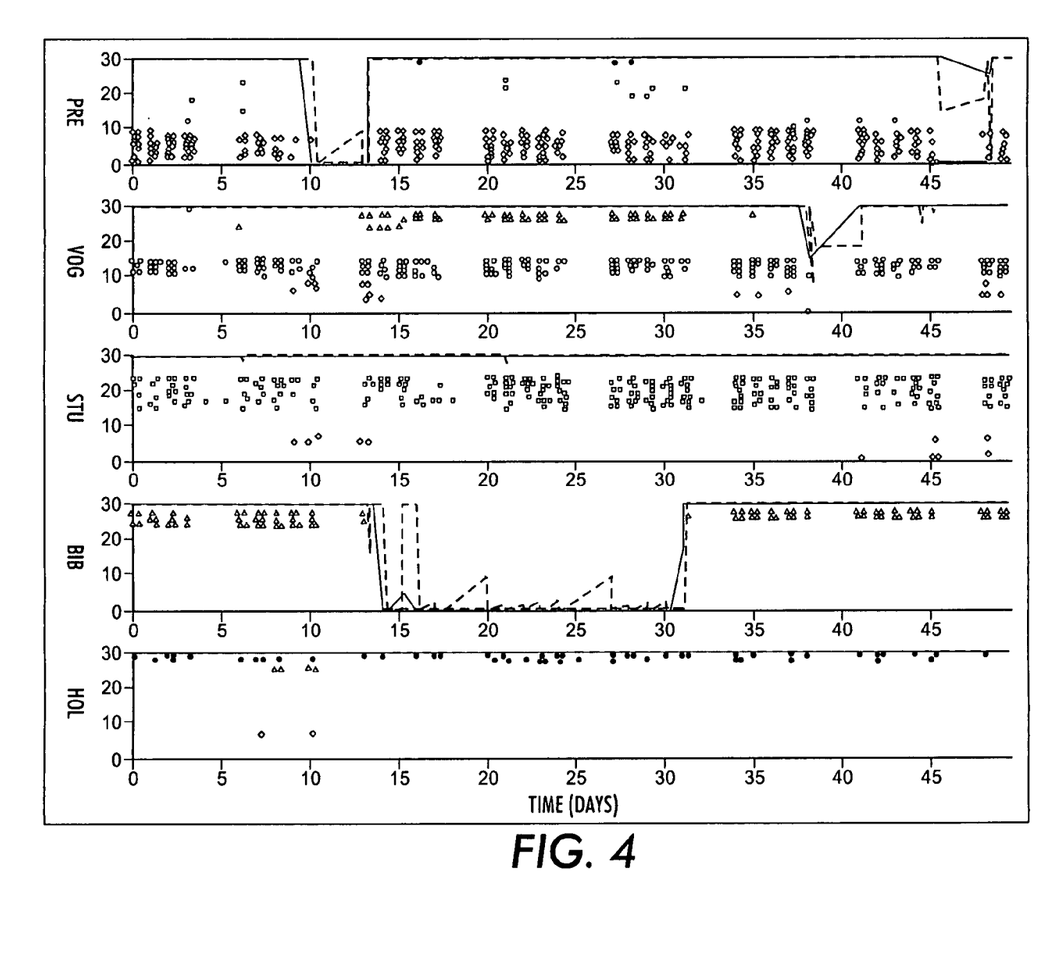
FIG. 4 diagrammatically plots the same data as in FIG. 3, but using an approximate particle filter in the FHMM rather than an exact inference.

With reference to FIG. 4, to validate the quality of the particle filter, the particle filter was used with 200 particles on the same data processed exactly in FIG. 3. The results are shown in FIG. 4, using the same plotting format as in FIG. 3. The inference modeling results are shown by a solid line. For comparison, the same dashed line as in FIG. 3 shows the filtering of the raw data. The estimated operational states are approximately the same as for the exact algorithm, with slight variations in the probabilities. The decisions regarding failures are the same, apart for the third soft failure at day 45 on printer "Pre", where the smoother does not detect a failure. In additional experiments using different number of particles, it was found that using more particles improved the results. Indeed, it is known that the particle filter tends to the exact solution as the number of particle increases.

The factorial hidden Markov modeling with approximate inference was used for $N_d=18$ printers. The inference was fast enough (more than 100 logs per second) to allow a real time failure detection, even for larger printing device networks. Some non-normal states were found to correspond to failure or printing device removal. In some other cases, a non-normal state was found to correspond to an exceptional event, for example when many users decided to print on a color printer. In such cases, the printer was classified as experiencing a failure even though it was still working. It is anticipated that such mis-classifications can be reduced by decreasing the failure rate $\tau$. An occasional "false" warning to the administrator due to a non-normal state that does not correspond with an equipment malfunction is not necessarily disadvantageous. It is typically useful for the system administrator to be made aware of any substantial deviation from the past pattern of usage, even if the deviation is not due to equipment malfunction. Such deviations may reflect, for example, relocation of a group of users, changes in the printing requirements of a group of users (e.g., management now requires all monthly reports to be printed in color), or so forth.

In the actually implemented embodiments, the state model employed a set of discrete binary operational states including (I) a normal state indicating that the recent load of jobs is substantially similar to typical loading of the hardware device, and (II) a malfunctioning state indicating that the recent load of jobs is substantially reduced. In other contemplated embodiments, a set of three or more discrete operational states are provided, including at least (I) a normal state indicating that the recent load of jobs is substantially similar to typical loading of the hardware device, (II) an unavailable state indicating that the recent load of jobs is substantially zero, and (III) at least one intermediate state indicating that a recent load of jobs is intermediate between typical loading and a load of substantially zero. In yet other contemplated embodiments, a continuum of operational states are provided between and including (I) a normal state indicating that the recent load of jobs is substantially similar to typical loading of the hardware device and (II) an unavailable state indicating that the recent load of jobs is substantially zero. When intermediate operational states are provided (e.g., L>1), the failure of a printing device can be quantified based on the operational state. For example, if L=4 then there are five allowable operational states: (0, 0.25, 0.50, 0.75, 1). A printing device in state 0.25 can in general be expected to be experiencing a more substantial failure than a printing device in operational state 0.75.

With reference to FIG. 1 and review of FIGS. 3 and 4, it is seen that the modeling advantageously identifies failures in the graphical plots output by the graphical analysis display formatter 36, and the modeling can also be used to activate the printing device problem warning 32. Even without the mathematical probabilistic modeling (solid and dashed lines of FIGS. 3 and 4), however, it is seen that suitable graphical representation by the graphical analysis display formatter 36 can be used to graphically model past patterns of usage and hence enable inference of soft failures or complete malfunctions of printing devices from graphically perceptible deviations from those past patterns of usage. For example, the usage model can involve dividing users into the plurality of user communities, each user community associated with a corresponding primary printing device and including users who primarily send print jobs to the corresponding primary printing device. The printing usage monitor is then configured to detect as a deviation a substantial redirection of print jobs initiated by a user community away from the corresponding primary printing device.

In one graphical modeling approach, logged jobs are visually grouped at least by printing device and by user community. This is done in FIGS. 3 and 4 by segregating print jobs into a separate plot for each printing device ("Pre", "Vog", "Stu", "Bib" and "Hol") and by plotting print jobs from each user community using a different symbol. Based on such graphical plot modeling, a soft failure of a failing printing device is readily inferable from a substantial (e.g., visually perceptible) fraction of print jobs of the user community associated with a corresponding primary printing device being grouped with a printing device other than the primary printing device of that user community over a soft failure time interval. Other ways of visually grouping print jobs by user community and by destination printing device can employ, for example: (i) color coding; (ii) using different symbols (e.g., different symbols used for different user communities in FIGS. 3 and 4); (iii) spatial segregation (e.g., in FIGS. 3 and 4 print jobs are segregated into separate plots for each printing device); and (iv) limiting the plotting to jobs belonging to a single printing device or to print jobs belonging to a single user community.

In such a graphical modeling approach, a soft failure is inferred over a soft failure time interval during which the user community corresponding to the failing printing device sends a disproportionate fraction of its jobs to other than the failing hardware device. For example, even without the solid FHMM model line, the graphical representation of FIGS. 3 and 4 show visually inferable failures of "Pre" (starting at times t=10 and t=45) and "Bib" (starting at time t=13) because the load of those printing devices have been shifted to other printing devices over the failure time interval. The "disproportionate fraction" is disproportionate respective to the pattern of past usage for the failing printing device. The extent of failure can be quantified by the magnitude of the disproportionate fraction. For example, if under normal conditions a user group sends about 90% of its print jobs to its primary printing device, then a decrease of this fraction to 60% may indicate a relatively minor soft failure, while a decrease to 30% may indicate a more serious soft failure. A decrease to substantially zero suggests that the primary printing device is non-operational.

The illustrated embodiments relate to the example printing device networks. However, those skilled in the art will readily recognize that the failure detection techniques disclosed herein are readily applied to other types of hardware device networks, such as networks of photocopiers, networks of facsimile machines, networks of multi-functional devices, and so forth.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An apparatus for monitoring printing devices of a printing devices network, the apparatus comprising:
 a family of usage models representing typical usage of the printing devices of the printing devices network, each usage model comprising a state model that assigns an operational state to each printing device depending upon usage of the printing device, the assigned state of each printing device being selected from the group consisting of (i) an unavailable state in which the printing device is not available, (ii) a normal state in which the printing device is working normally, and (iii) one or more discrete or continuous intermediate states intermediate between the unavailable and normal states in which the printing device is experiencing a soft failure intermediate between being unavailable and working normally;
 an adaptation procedure allowing selection of one model within that family, based on a printing devices usage log maintained by the printing devices network; and
 a printing usage monitor configured to detect deviation of logged usage of a printing device from the usage model indicative of a soft failure on that device, the printing usage monitor comprising a display configured to plot as a function of time print jobs logged to a displayed printing device in the printing devices usage log, and further configured to plot as a function of time the state of the displayed printing device.

2. An apparatus as set forth in claim 1, wherein each usage model comprises:
 a factorial hidden Markov-based model that estimates an operational state for each printing device as a function of usage of the printing device by users.

3. An apparatus as set forth in claim 1, wherein the printing usage monitor provides an indication that a given printing device is experiencing at least a soft failure responsive to the operational state of the given printing device being in other than the normal state.

4. An apparatus as set forth in claim 1, wherein the printing usage monitor provides an indication that a given printing device is experiencing at least a soft failure responsive to the operational state of the given printing device being in either the unavailable state or in at least a portion of the one or more discrete or continuous intermediate states proximate to the unavailable state.

5. An apparatus as set forth in claim 1, wherein:
the family of usage models comprise a plurality of user communities, each user community associated with a corresponding primary printing device and including users who primarily send print jobs to the corresponding primary printing device; and
the printing usage monitor is configured to detect as a deviation a substantial redirection of print jobs initiated by a user community away from the corresponding primary printing device.

6. An apparatus as set forth in claim 5, wherein the printing usage monitor quantifies the deviation based on an extent of the redirection of print jobs away from the corresponding primary printing device.

7. An apparatus as set forth in claim 5, wherein the display of the printing usage monitor is configured to plot as a function of time print jobs logged to the primary printing device associated with the deviation.

8. An apparatus as set forth in claim 1, wherein the family of usage models include:
a family of black usage models representing typical usage of the printing devices of the printing devices network for print jobs involving black-only marking; and
a family of color usage models representing typical usage of the printing devices of the printing devices network for print jobs involving color marking.

9. A method for detecting soft failures of hardware devices of a hardware devices network, the method comprising:
analyzing past logged jobs to determine a pattern of past usage of hardware devices by users of the hardware devices network, the analyzing being performed by a network server of the hardware devices network;
inferring a soft failure of a hardware device based on a deviation in usage of the hardware devices from the pattern of past usage, wherein the inferring includes at least one of:
(I) inferring a soft failure of a failing hardware device over a soft failure time interval during which the user community corresponding to the failing hardware device sends a disproportionate fraction of its jobs to other than the failing hardware device, the disproportionate fraction being disproportionate respective to the pattern of past usage for the failing hardware device, and
(II) plotting logged lobs visually grouped at least by hardware device and by user community, soft failure of a failing hardware device being inferable from a substantial fraction of jobs of the user community associated with the monitored hardware device being grouped with hardware devices other than the monitored hardware device over a soft failure time interval.

10. A method as set forth in claim 9, wherein the analyzing comprises:
for each hardware device whose usage is logged, identifying a corresponding user community including one or more users whose past logged jobs have been primarily sent to that hardware device.

11. A method as set forth in claim 10, wherein the inferring comprises:
inferring a soft failure of a failing hardware device over a soft failure time interval during which the user community corresponding to the failing hardware device sends a disproportionate fraction of its jobs to other than the failing hardware device, the disproportionate fraction being disproportionate respective to the pattern of past usage for the failing hardware device.

12. A method as set forth in claim 11, wherein the inferring further comprises:
quantifying the soft failure of the failing hardware device over the detected soft failure time interval based on at least a magnitude of the disproportionate fraction.

13. A method as set forth in claim 10, wherein the inferring comprises:
plotting logged jobs visually grouped at least by hardware device and by user community, soft failure of a failing hardware device being inferable from a substantial fraction of jobs of the user community associated with the monitored hardware device being grouped with hardware devices other than the monitored hardware device over a soft failure time interval.

14. A method as set forth in claim 13, wherein the visual groupings are effectuated by at least two of: (i) color coding, (ii) using different symbols, (iii) spatial segregation, and (iv) limiting the plotting to jobs belonging to a single hardware device or belonging to a single user community.

15. A method for detecting soft failures of hardware devices of a hardware devices network, the method comprising:
analyzing past logged jobs to determine a pattern of past usage of hardware devices by users of the hardware devices network, the analyzing being performed by a network server of the hardware devices network, the analyzing including constructing a state model that assigns an operational state to each hardware device depending upon a load of jobs logged to that hardware device, the assigned state of each hardware device being selected from the group consisting of (i) a normal state in which the load is substantially similar to a normal load indicated by the analyzed past logged jobs, (ii) an unavailable state in which the load is substantially zero, and (iii) one or more discrete or continuous intermediate states intermediate between the normal and unavailable states in which the load is less load than in the normal state load but greater than substantially zero; and
inferring a soft failure of a hardware device based on a deviation in usage of the hardware devices from the pattern of past usage, the inferring including inferring a soft failure of a failing hardware device responsive to the operational state assigned to the failing hardware device being the unavailable state or one or more selected intermediate states.

16. A method as set forth in claim 15, wherein the inferring further comprises:
quantifying the soft failure of the failing hardware device based on the operational state assigned to the failing hardware device.

17. A method as set forth in claim 15, wherein the state model is a factorial hidden Markov-based model.

18. A storage medium encoding instructions which when executed by a processor communicating with a hardware devices network performs a method for monitoring hardware devices of the hardware devices network, the method including (i) constructing a state model that assigns one of two or more available operational states to each hardware device of the hardware devices network based on a recent load of jobs logged to the hardware device and a stored history of logged jobs indicative of typical loading of the hardware devices, and (ii) identifying one or more failing hardware devices based on the assigned operational states.

19. A storage medium as set forth in claim 18, wherein the method constructs a factorial hidden Markov-based state model.

20. A storage medium as set forth in claim 18, wherein the hardware devices include a plurality of printing devices at least some of which are capable of printing in color, and the constructing of the state model includes:

constructing a black state model that assigns one of two or more available black marking operational states to each printing device of the printing devices network that is used for black-only printing based on a recent load of black-only print jobs logged to the printing device and a stored history of logged black-only print jobs indicative of typical black-only print job loading of the printing devices, and constructing a color state model that assigns one of two or more available color marking operational states to each printing device of the printing devices network that is used for color printing based on a recent load of color print jobs logged to the printing device and a stored history of logged color print jobs indicative of typical color print job loading of the printing devices.

21. A storage medium as set forth in claim 18, wherein the two or more available operational states are one of:

a set of discrete binary operational states including (I) a normal state indicating that the recent load of jobs is substantially similar to typical loading of the hardware device, and (II) a malfunctioning state indicating that the recent load of jobs is substantially reduced, and a set of three or more discrete operational states including at least (I) a normal state indicating that the recent load of jobs is substantially similar to typical loading of the hardware device, (II) an unavailable state indicating that the recent load of jobs is substantially zero, and (III) at least one intermediate state indicating that a recent load of jobs is intermediate between typical loading and a load of substantially zero, and a continuum of operational states between and including (I) a normal state indicating that the recent load of jobs is substantially similar to typical loading of the hardware device and (II) an unavailable state indicating that the recent load of jobs is substantially zero.

\* \* \* \* \*